E. P. BATES.
Steam Cooking-Vessel.
No. 161,092. Patented March 23, 1875.
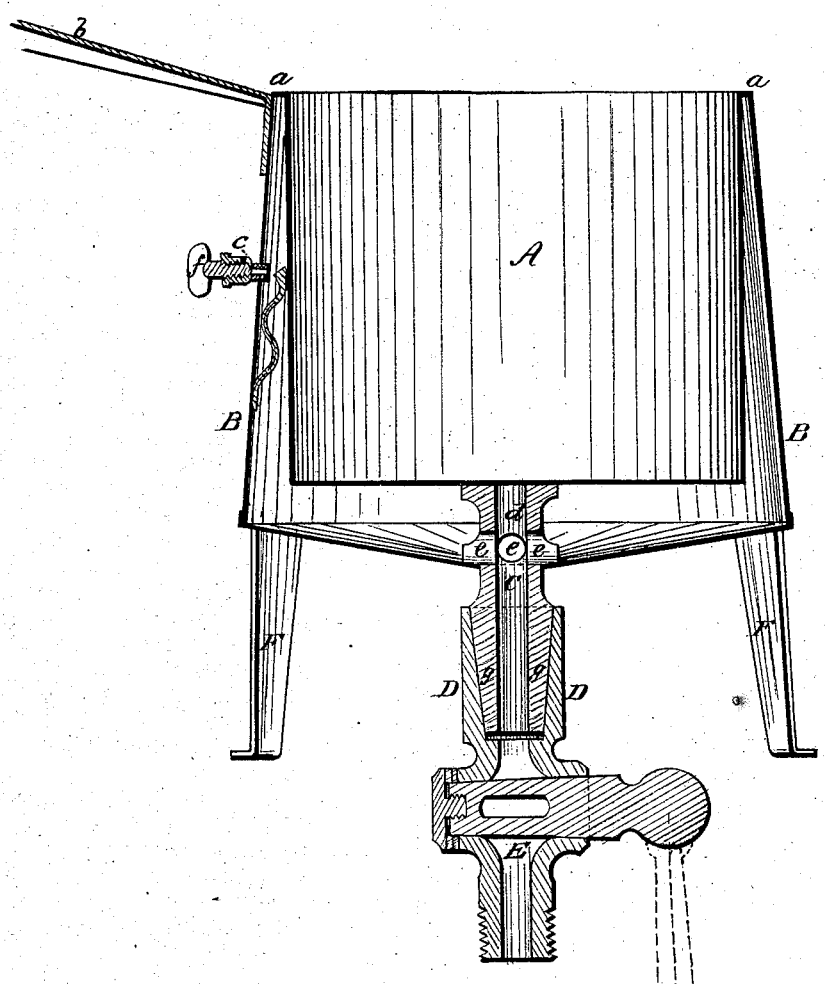
WITNESSES.
INVENTOR.
THE GRAPHIC CO.PHOTO-LITH.39 & 41 PARK PLACE,N.Y.

UNITED STATES PATENT OFFICE.

EDWARD P. BATES, OF SYRACUSE, ASSIGNOR OF ONE-HALF HIS RIGHT TO WYLLYS H. WARNER, OF BROOKLYN, NEW YORK.

IMPROVEMENT IN STEAM COOKING-VESSELS.

Specification forming part of Letters Patent No. 161,092, dated March 23, 1875; application filed November 23, 1874.

*To all whom it may concern:*

Be it known that I, EDWARD P. BATES, of Syracuse, Onondaga county, New York, have invented certain Improvements in Steam Cooking-Vessels, of which the following is a specification:

My invention relates to steam cooking-vessels; and consists in a novel construction, combination, and arrangement of parts, which have for their object to improve the operation of the apparatus, and facilitate the manipulation of it, as will be fully hereafter set forth.

The drawing is a vertical transverse section through the center.

In this device the vessel for holding the food to be cooked or warmed is constructed with hollow walls, or, in other words, it is an inner vessel and an outer steam-tight jacket, the two being secured together by soldering, or otherwise, at their brims. The steam is admitted to the space between the two by a pipe or tube soldered to the bottom of the vessel, and having a taper end, $g$, which fits into a socket in the steam-pipe or cock, and forms a steam-tight joint therewith.

In the drawing, A represents the inner vessel, and B the outer jacket, secured together at their brims $a$. C is the pipe entering the bottom of the vessel. D is the socket, into which C fits, and forms a steam-tight joint. E is the cock to be screwed into any steam-pipe. F are the supporting-legs of the apparatus. $b$ is the handle; $c$, a vent for the escape of air from between the inner vessel and the outer jacket. The upper part $d$ of the tube C serves as a stay and support for A and B. The bottom of the outer jacket B is inclined toward the center, and the tube C has holes $e$ flush with the bottom, for allowing the water of condensation to pass off through the pipe.

In manipulating the apparatus the tube C is inserted into the socket D, and steam admitted to the space between the jacket B and vessel A. The steam will expel the air through the vent, and the key $f$ is then screwed down, so as to close the vent. The steam will impart its heat to the contents of the vessel, and becoming condensed, pass off through the apertures in the tube C, and thence down through the steam-pipe. After the contents of the vessel have been sufficiently cooked or warmed, the steam is shut off, and the vessel lifted off the socket and placed on its legs.

This apparatus will be of great utility in hospitals, sick-chambers, dining-rooms, and everywhere where it is necessary or desirable to have some means whereby food or liquids can be cooked or warmed, where connection can be had with a steam-boiler.

I am aware that kettles incased in a steam-tight jacket have been used prior to my invention, and I disclaim all such devices.

What I do claim is—

The combination, with the jacketed vessel A B, provided with legs F F, of the taper tube C, with perforations $e$ $e$, and the socket D, forming a steam-tight connection with the steam-supply pipe, constructed and operating substantially in the manner described and specified.

EDWARD P. BATES.

Witnesses:
WILLIAM F. ASHLEY,
HORACE H. WALPOLE.